United States Patent
Mendelovich et al.

(10) Patent No.: US 9,832,642 B2
(45) Date of Patent: *Nov. 28, 2017

(54) SIMPLIFIED LOGIN FOR MOBILE DEVICES (71) Applicant: Microsoft Technology Licensing, LLC, Redmond, WA (US)

(72) Inventors: Meir Mendelovich, Rishon Leziyyon (IL); John Neystadt, Kfar-Saba (IL); Ken Aoyama, Tokyo (JP); Nir Nice, Kfar Veradim (IL); Shay Yehuda Gurman, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,730

(22) Filed: Oct. 5, 2015

(65) Prior Publication Data

US 2016/0037343 A1    Feb. 4, 2016

Related U.S. Application Data (63) Continuation of application No. 14/153,964, filed on Jan. 13, 2014, now Pat. No. 9,154,505, which is a (Continued)

(51) Int. Cl.
*H04W 12/06* (2009.01)
*H04L 29/06* (2006.01)
(Continued)

(52) U.S. Cl.
CPC ............. *H04W 12/06* (2013.01); *H04L 9/321* (2013.01); *H04L 9/3226* (2013.01);
(Continued)

(58) Field of Classification Search
CPC .......... H04W 12/06; H04L 9/32; H04L 9/321; H04L 9/3226
(Continued)

(56) References Cited

U.S. PATENT DOCUMENTS 6,823,373 B1    11/2004    Pancha et al.
7,058,180 B2     6/2006    Ferchichi et al.
(Continued)

FOREIGN PATENT DOCUMENTS

EP    1102157 B1    1/2008
WO    0211477 A1    2/2002
(Continued)

OTHER PUBLICATIONS

"Non-Final Office Action Issued in U.S. Appl. No. 12/109,580", dated Feb. 23, 2011, 15 Pages.
(Continued)

*Primary Examiner* — Jeffrey Pwu
*Assistant Examiner* — Samuel Ambaye
(74) *Attorney, Agent, or Firm* — Wade IP Law LLC (57) ABSTRACT

Aspects of the subject matter described herein relate to a simplified login for mobile devices. In aspects, on a first logon, a mobile device asks a user to enter credentials and a PIN. The credentials and PIN are sent to a server which validates user credentials. If the user credentials are valid, the server encrypts data that includes at least the user credentials and the PIN and sends the encrypted data to the mobile device. In subsequent logons, the user may logon using only the PIN. During login, the mobile device sends the PIN in conjunction with the encrypted data. The server can then decrypt the data and compare the received PIN with the decrypted PIN. If the PINs are equal, the server may grant access to a resource according to the credentials.

20 Claims, 11 Drawing Sheets

Related U.S. Application Data continuation of application No. 12/109,580, filed on Apr. 25, 2008, now Pat. No. 8,631,237.

(51) Int. Cl.
   *H04W 12/02* (2009.01)
   *H04L 9/00* (2006.01)
   *H04L 9/32* (2006.01)

(52) U.S. Cl.
   CPC ........ *H04L 63/0428* (2013.01); *H04L 63/083* (2013.01); *H04L 63/10* (2013.01); *H04W 12/02* (2013.01); *H04L 9/00* (2013.01); *H04L 9/32* (2013.01)

(58) Field of Classification Search
   USPC .................................. 713/168, 155; 380/259
   See application file for complete search history.

(56) References Cited

U.S. PATENT DOCUMENTS

| | | | |
|---|---|---|---|
| 7,120,928 | B2 | 10/2006 | Sheth et al. |
| 7,258,267 | B2 | 8/2007 | Choi |
| 7,296,066 | B2 | 11/2007 | Lehaff et al. |
| 2002/0169958 | A1 | 11/2002 | Nyman et al. |
| 2004/0187018 | A1* | 9/2004 | Owen ................. G06F 21/31 713/184 |
| 2006/0053480 | A1 | 3/2006 | Lacasse et al. |
| 2006/0121882 | A1* | 6/2006 | Zhao ................. H04W 8/183 455/411 |
| 2007/0079135 | A1 | 4/2007 | Saito |
| 2007/0107050 | A1* | 5/2007 | Selvarajan ............. G06F 21/31 726/5 |
| 2007/0180504 | A1 | 8/2007 | Hung |

FOREIGN PATENT DOCUMENTS

| | | |
|---|---|---|
| WO | 2006030281 A2 | 3/2006 |
| WO | 2006030281 A3 | 10/2006 |

OTHER PUBLICATIONS

"Final Office Action Issued in U.S. Appl. No. 12/109,580", dated Oct. 27, 2011, 19 Pages.

"Non-Final Office Action Issued in U.S. Appl. No. 12/109,580", dated Feb. 16, 2012, 17 Pages.

"Final Office Action Issued in U.S. Appl. No. 12/109,580", dated Aug. 16, 2012, 20 Pages.

"Non-Final Office Action Issued in U.S. Appl. No. 12/109,580", dated Jan. 7, 2013, 17 Pages.

"Notice of Allowance Issued in U.S. Appl. No. 12/109,580", dated Jul. 9, 2013, 10 Pages.

"Non-Final Office Action Issued in U.S. Appl. No. 14/153,964", dated Dec. 19, 2014, 24 Pages.

"Notice of Allowance Issued in U.S. Appl. No. 14/153,964", dated Jun. 2, 2015, 8 Pages.

"Get Your Modo Working", Published on: Sep. 2007, 8 pages, Available at: http://www.manxtelecom.com/pdf/modo_user_guide_web.pdf.

Shirazi-Shahreza, et al., "Passwordless Login System for Mobile Phones Using CAPTCHA", In Proceedings of the 49th International Symposium ELMAR, Sep. 12, 2007, pp. 243-246.

* cited by examiner

SIMPLIFIED LOGIN FOR MOBILE DEVICES

CROSS-REFERENCE TO RELATED APPLICATION(S)

This application is a continuation of U.S. patent application Ser. No. 14/153,964, entitled "Simplified Login for Mobile Devices," filed Jan. 13, 2014, which is a continuation of U.S. patent application Ser. No. 12/109,580, entitled "Simplified Login for Mobile Devices," filed Apr. 25, 2008 (now U.S. Pat. No. 8,631,237), both of which are incorporated herein by reference in their entireties.

BACKGROUND

Modern secure passwords are often longer than eight characters and may use several different types of characters including lower case letters, upper case letters, digits, and symbols. These character combinations may be difficult to type into a cell phone or other mobile device. At the same time, however, allowing a mobile device to remember a user name and password may reduce the security of a system, particularly as mobile devices are often more frequently stolen than stationary devices.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to a simplified login for mobile devices. In aspects, on a first logon, a mobile device asks a user to enter credentials and a PIN. The credentials and PIN are sent to a server which validates user credentials. If the user credentials are valid, the server encrypts data that includes at least the user credentials and the PIN and sends the encrypted data to the mobile device. In subsequent logons, the user may logon using only the PIN. During login, the mobile device sends the PIN in conjunction with the encrypted data. The server can then decrypt the data and compare the received PIN with the decrypted PIN. If the PINs are equal, the server may grant access to a resource according to the credentials.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
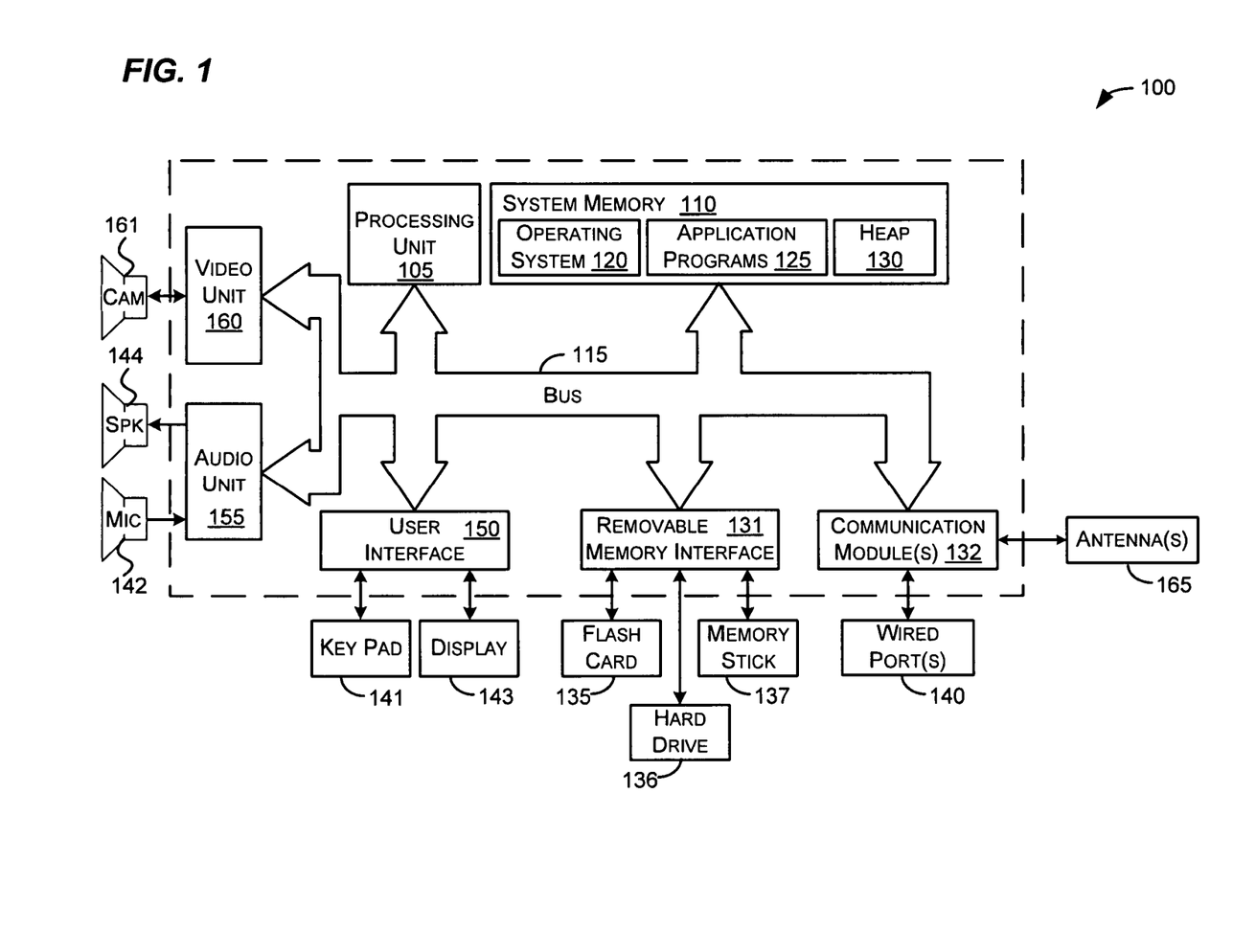
FIG. 1 is a block diagram representing an exemplary mobile device into which aspects of the subject matter described herein may be incorporated.

FIG. 1 illustrates an example of a suitable mobile device 100 on which aspects of the subject matter described herein may be implemented. The mobile device 100 is only one example of a device and is not intended to suggest any limitation as to the scope of use or functionality of aspects of the subject matter described herein. Neither should the mobile device 100 be interpreted as having any dependency or requirement relating to any one or combination of components illustrated in the exemplary mobile device 100.

With reference to FIG. 1, an exemplary device for implementing aspects of the subject matter described herein includes a mobile device 100. In some embodiments, the mobile device 100 comprises a cell phone, a handheld device that allows voice communications with others, some other voice communications device, or the like. In these embodiments, the mobile device 100 may be equipped with a camera for taking pictures, although this may not be included in other embodiments. In other embodiments, the mobile device 100 comprises a personal digital assistant (PDA), hand-held gaming device, notebook computer, printer, appliance including a set-top, media center, or other appliance, automobile-embedded or attached computing devices, other mobile devices, or the like. In yet other embodiments, the mobile device 100 may comprise devices that are generally considered non-mobile such as personal computers, servers, or the like.

Components of the mobile device 100 may include, but are not limited to, a processing unit 105, system memory 110, and a bus 115 that couples various system components including the system memory 110 to the processing unit 105. The bus 115 may include any of several types of bus structures including a memory bus, memory controller, a peripheral bus, and a local bus using any of a variety of bus architectures, and the like. The bus 115 allows data to be transmitted between various components of the mobile device 100.

The mobile device 100 may include a variety of computer-readable media. Computer-readable media can be any available media that can be accessed by the mobile device 100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 100.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, WiFi, WiMAX, and other wireless media. Combinations of any of the above should also be included within the scope of computer-readable media.

The system memory 110 includes computer storage media in the form of volatile and/or nonvolatile memory and may include read only memory (ROM) and random access memory (RAM). On a mobile device such as a cell phone, operating system code 120 is sometimes included in ROM although, in other embodiments, this is not required. Similarly, application programs 125 are often placed in RAM although again, in other embodiments, application programs may be placed in ROM or in other computer-readable memory. The heap 130 provides memory for state associated with the operating system code 120 and the application programs 125. For example, the operating system code 120 and application programs 125 may store variables and data structures in the heap 130 during their operations.

The mobile device 100 may also include other removable/non-removable, volatile/nonvolatile memory. By way of example, FIG. 1 illustrates a flash card 135, a hard disk drive 136, and a memory stick 137. The hard disk drive 136 may be miniaturized to fit in a memory slot, for example. The mobile device 100 may interface with these types of non-volatile removable memory via a removable memory interface 131, or may be connected via a universal serial bus (USB), IEEE 1394, one or more of the wired port(s) 140, or antenna(s) 165. In these embodiments, the removable memory devices 135-137 may interface with the mobile device via the communications module(s) 132. In some embodiments, not all of these types of memory may be included on a single mobile device. In other embodiments, one or more of these and other types of removable memory may be included on a single mobile device.

In some embodiments, the hard disk drive 136 may be connected in such a way as to be more permanently attached to the mobile device 100. For example, the hard disk drive 136 may be connected to an interface such as parallel advanced technology attachment (PATA), serial advanced technology attachment (SATA) or otherwise, which may be connected to the bus 115. In such embodiments, removing the hard drive may involve removing a cover of the mobile device 100 and removing screws or other fasteners that connect the hard drive 136 to support structures within the mobile device 100.

The removable memory devices 135-137 and their associated computer storage media, discussed above and illustrated in FIG. 1, provide storage of computer-readable instructions, program modules, data structures, and other data for the mobile device 100. For example, the removable memory device 135-137 may store images taken by the mobile device 100, voice recordings, contact information, programs, data for the programs and so forth.

A user may enter commands and information into the mobile device 100 through input devices such as a key pad 141 and the microphone 142. In some embodiments, the display 143 may be touch-sensitive screen and may allow a user to enter commands and information thereon. The key pad 141 and display 143 may be connected to the processing unit 105 through a user input interface 150 that is coupled to the bus 115, but may also be connected by other interface and bus structures, such as the communications module(s) 132 and wired port(s) 140.

A user may communicate with other users via speaking into the microphone 142 and via text messages that are entered on the key pad 141 or a touch sensitive display 143, for example. The audio unit 155 may provide electrical signals to drive the speaker 144 as well as receive and digitize audio signals received from the microphone 142.

The mobile device 100 may include a video unit 160 that provides signals to drive a camera 161. The video unit 160 may also receive images obtained by the camera 161 and provide these images to the processing unit 105 and/or memory included on the mobile device 100. The images obtained by the camera 161 may comprise video, one or more images that do not form a video, or some combination thereof.

The communications module(s) 132 may provide signals to and receive signals from one or more antenna(s) 165. One of the antenna(s) 165 may transmit and receive messages for a cell phone network. Another antenna may transmit and receive Bluetooth® messages. Yet another antenna may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile device 100 may connect to one or more remote devices. The remote devices may include a personal computer, a server, a router, a network PC, a cell phone, a peer device or other common network node, and typically includes many or all of the elements described above relative to the mobile device 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is sometimes used herein, it will be recognized that this term may also encompass a client, a set of one or more processes distributed on one or more computers, one or more stand-alone storage devices, a set of one or more other devices, a combination of one or more of the above, and the like.

Mobile Login

As mentioned previously, mobile devices may have input capabilities that make it more difficult to enter in passwords. In accordance with aspects of the subject matter described herein, a user may be allowed to logon to a server using a number. This number is sometimes referred to as a PIN herein. When the user first logs onto the server, the user may be asked for a username, password, and PIN. When the user subsequently logs onto the server, the user may enter the PIN only. Periodically, the user may be prompted for a user name and password again.

Figure 2:
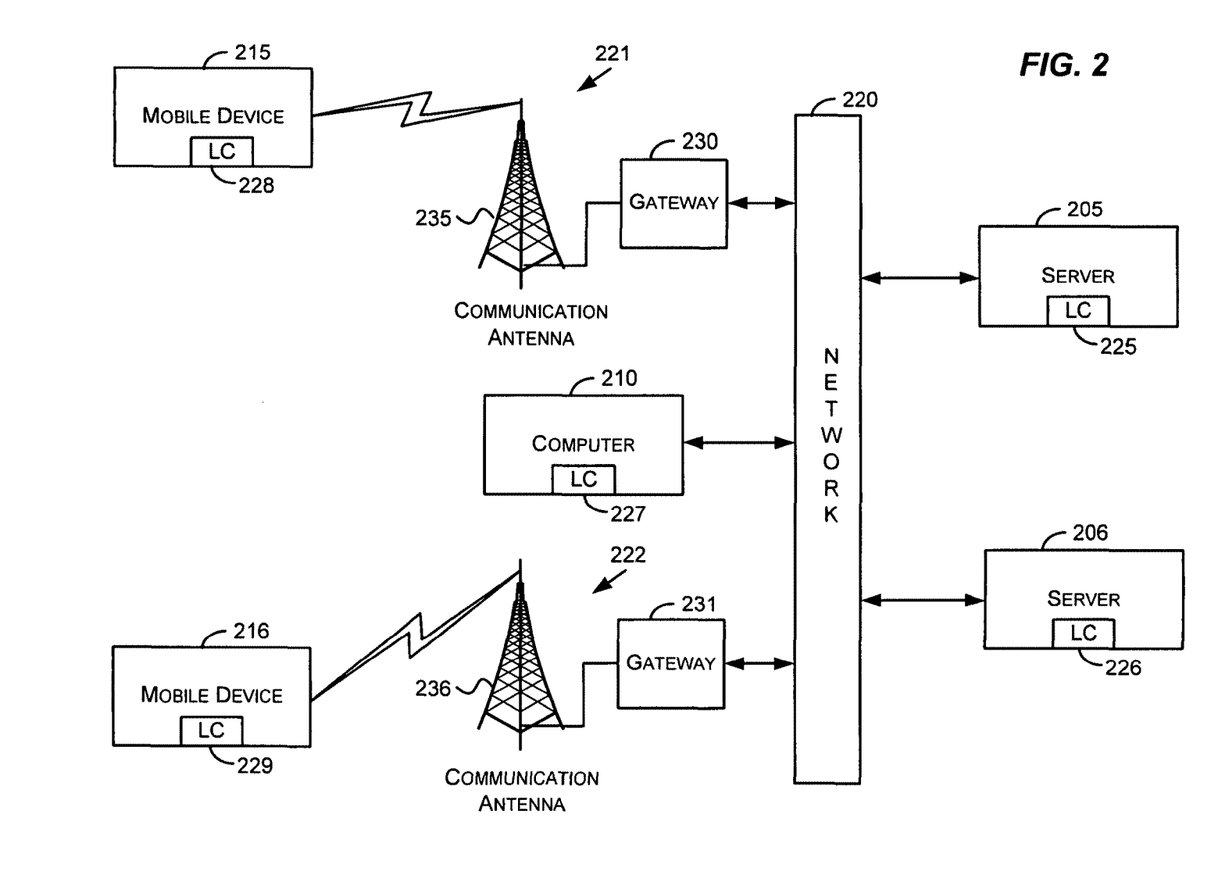
FIG. 2 is a block diagram that represents an exemplary environment in which aspects of the subject matter described herein may be implemented.

FIG. 2 is a block diagram that represents an exemplary environment in which aspects of the subject matter described herein may be implemented. The environment includes servers 205-206, computer 210, and mobile devices 215-216 (hereinafter sometimes collectively referred to as the entities) and may include other components (not shown). The entities may communicate with each other via various networks including intra- and inter-office networks, telephone lines, the network 220, wireless networks 221 and 222, other wireless and wired networks, and the like. In one embodiment, the network 220 may comprise the Internet.

A wireless network (e.g., each of the wireless networks 235 and 236) may comprise one or more components that are capable of communicating with mobile devices. The wireless networks 221 and 222 may be connected to the gateways 230 and 231, respectively. A gateway may function as a conduit to allow communications to and from the mobile devices 215 and 216 to entities connected to the network 220. The gateways may be implemented as part of or separate from mobile telephone switching offices that may control the operation of a cellular sub-system.

The servers 205-206, computer 210, and the mobile devices 215-216 may include login components 226-229, respectively. The login components 226-229 may comprise components that allow the mobile devices 215-216 and the computer 210 to log on to the servers 205-206. On the mobile device 215, for example, the login components 228 may comprise a web browser, client software, other software, or the like capable of communicating with the servers 205-206. On the server side, the login components 225-226 may include a web server, portal, application server, other content providing software, related software, or the like.

Each of the servers 205-206 and the computer 210 may be implemented on one or more computers and there is no intention to limit the types of computers to those thought particularly as server computers or client computers. Indeed a computer that serves as a home computer may at times serve as a server computer and vice versa.

In one embodiment, the mobile devices 215-216 may be implemented as described in conjunction with the mobile device 100 of FIG. 1. In one embodiment, the mobile devices 215-216 may comprise cell phones. In another embodiment, the mobile devices 215-216 may comprise notebook computers, other mobile devices, non-mobile devices, and the like as described previously in conjunction with FIG. 1.

Aspects of the subject matter described herein may also be applied to non-mobile devices such as the computer 210 and/or mobile devices with enhanced input capabilities or even a complete keyboard. It may be easier for a computer user to use a PIN as described herein than to enter a lengthy password for each logon.

Although the environment described above includes various numbers of each of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
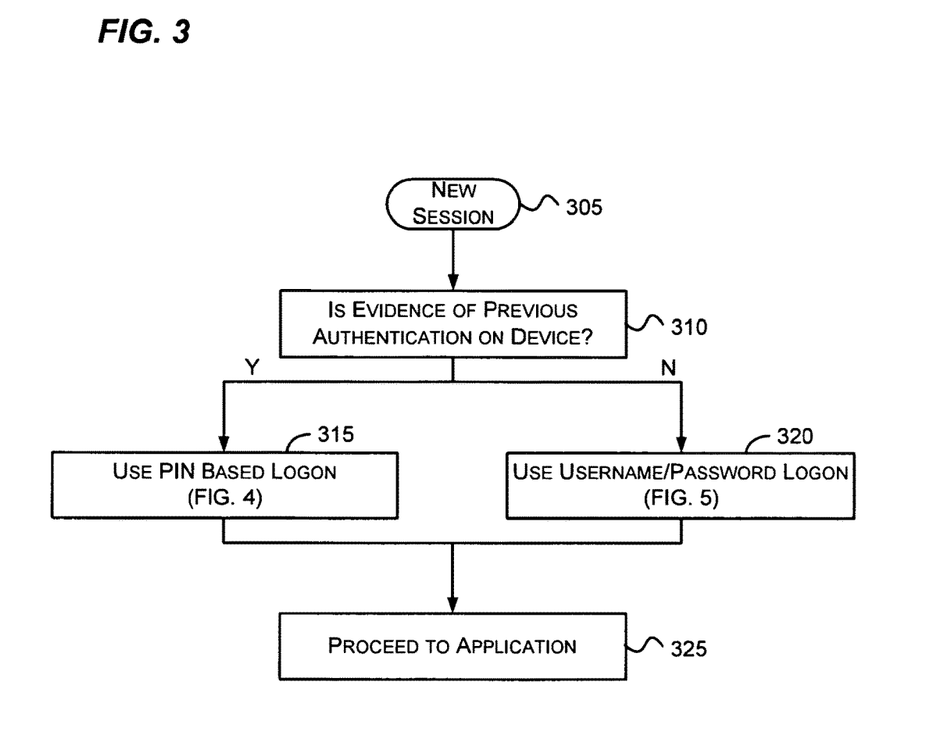
FIGS. 3-5 are flow diagrams that generally represent actions that may occur in conjunction with login on from mobile device in accordance with aspects of the subject matter described herein.
Figure 4:
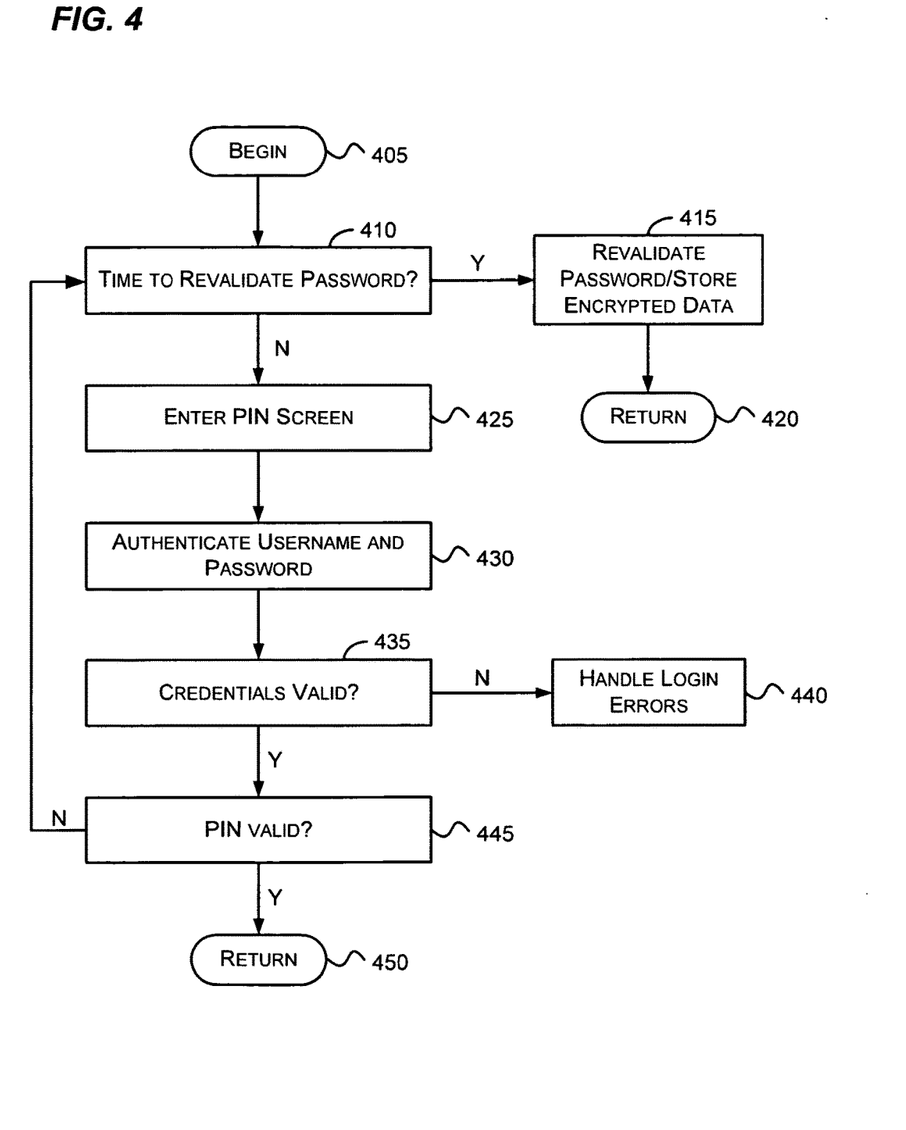
Figure 5:
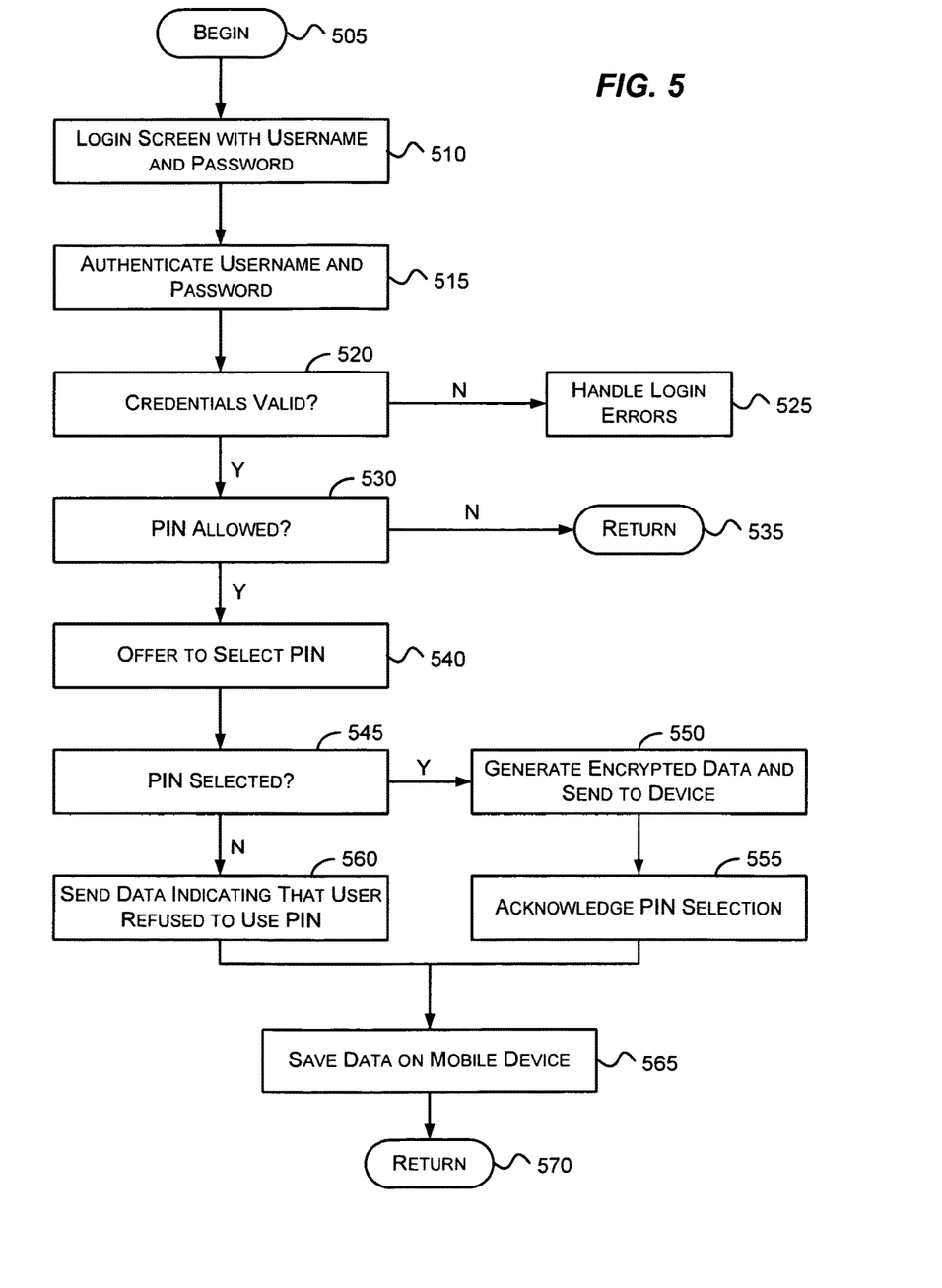

FIGS. 3-5 are flow diagrams that generally represent actions that may occur in conjunction with login on from mobile device in accordance with aspects of the subject matter described herein. For simplicity of explanation, the methodology described in conjunction with FIGS. 3-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin in conjunction with a user on a mobile device seeking to logon to a server. At block, 310, a determination is made as to whether evidence of previous authentication is stored on the mobile device. Evidence of previous authentication may have been sent to the mobile device in conjunction with a previous login (e.g., see the actions associated with block 550 below). This evidence may be stored on the mobile device in encrypted data. This evidence may include the credentials of a user. These credentials may include, for example, a username and password. Encrypted data sent to the mobile device may also include the previously entered PIN, the next password revalidation date, expiration time and strength of the original authentication (e.g., was it username/password only, certificate based, etc.), other information, and the like.

In one embodiment, the encrypted data may be stored in a cookie. When the mobile device requests a resource, the mobile device may send the cookie with the request. In another embodiment, the encrypted data may be stored in another data structure on the mobile device. To request a resource, the mobile device may, for example, embed the encrypted data in the parameter of a uniform resource locator (URL) or otherwise send the encrypted data. As used herein a resource comprises any thing, entity, service, data, program, or the like, that can be identified, name, addressed, handled, or otherwise accessed in any way over a network.

The encrypted data in combination with a PIN allows the server to verify that an authorized user is accessing the server. If the encrypted data is not on the mobile device or the user does not provide the correct PIN, the user is not granted access to the server. Furthermore, by placing the encrypted data on the mobile device, issues with respect to scalability may be reduced or avoided.

The encrypted data may be encrypted using virtually any encryption algorithm. Some exemplary suitable encryption algorithms include Advanced Encryption Standard (AES), Blowfish, Twofish, Data Encryption Standard (DES), Triple DES, Serpent, International Data Encryption Algorithm (IDEA), RC4, and the like, although other encryption algorithms may be used without departing from the spirit or scope of aspects of the subject matter described herein. The encryption algorithm may be implemented with a private server key that may be pre-configured on the server with some salt. For security, the key may be of sufficient length to resist brute force attacks. During configuration of the server, the system may offer the administrator an option to generate the key using a random function.

When a PIN is used to log on to a server, a policy may be enforced as to how often the password needs to be re-entered on the mobile device. In one embodiment, the policy may be settable by an administrator of the server. In another embodiment, the policy may be hard-coded. In one embodiment, a password may need to be re-entered once every seven days when using a PIN to log on. This is sometimes referred to as revalidating the password. When the password is revalidated, the server generates a new encrypted data with a new password revalidation date. This encrypted data is sent to the mobile device and is used to replace the old encrypted data there.

When the user logs into a system and enters a PIN, the encrypted data is sent to a server together with the PIN. The server may then decrypt the encrypted data to obtain the user credentials, valid PIN, revalidation date, and so forth. If the PIN that the user enters does not match the PIN in the encrypted data, the server may enforce a delay period (e.g., 5 seconds), a limited number of retries before locking the account, and/or other mechanisms to slow or stop an unauthorized attempt to gain access If evidence of previous authentication is on the device (e.g., in encrypted data), the actions continue at block 315; otherwise, the actions continue at block 320.

At block 315, the actions described in conjunction with FIG. 4 may occur. During these actions, a PIN may be used to log on to the server. To prevent a username/password from being stolen, a secure channel such as SSL may be used. If it is time to revalidate a password, a password or username and password may be requested to log on to the server.

At block 320, when the evidence of authentication (e.g., in encrypted data) is not on the device the actions described in conjunction with FIG. 5 may occur. During these actions a username and password logon may be requested to log on to the server as described in more detail in conjunction with FIG. 5.

At block 325, if the user is able to successfully log on, the user is allowed to proceed to the resource provided by the server.

FIG. 4 is a block diagram illustrating actions associated with block 315 of FIG. 3 in accordance with aspects of the subject matter described herein. FIG. 4 includes exemplary actions that may occur during a second (or subsequent) logon activity. At block 405, the actions begin.

At block 410, a determination is made as to whether it is time to revalidate the password. If so, the actions continue at block 415; otherwise, the actions continue at block 425. For example, if the mobile device 215 attempts to logon to the server 205 using a PIN, the server 205 may determine using information in the encrypted data or elsewhere that it is time to revalidate the password on the mobile device 215. The server 205 may then send a request for a password to the mobile device 215.

Figure 6:
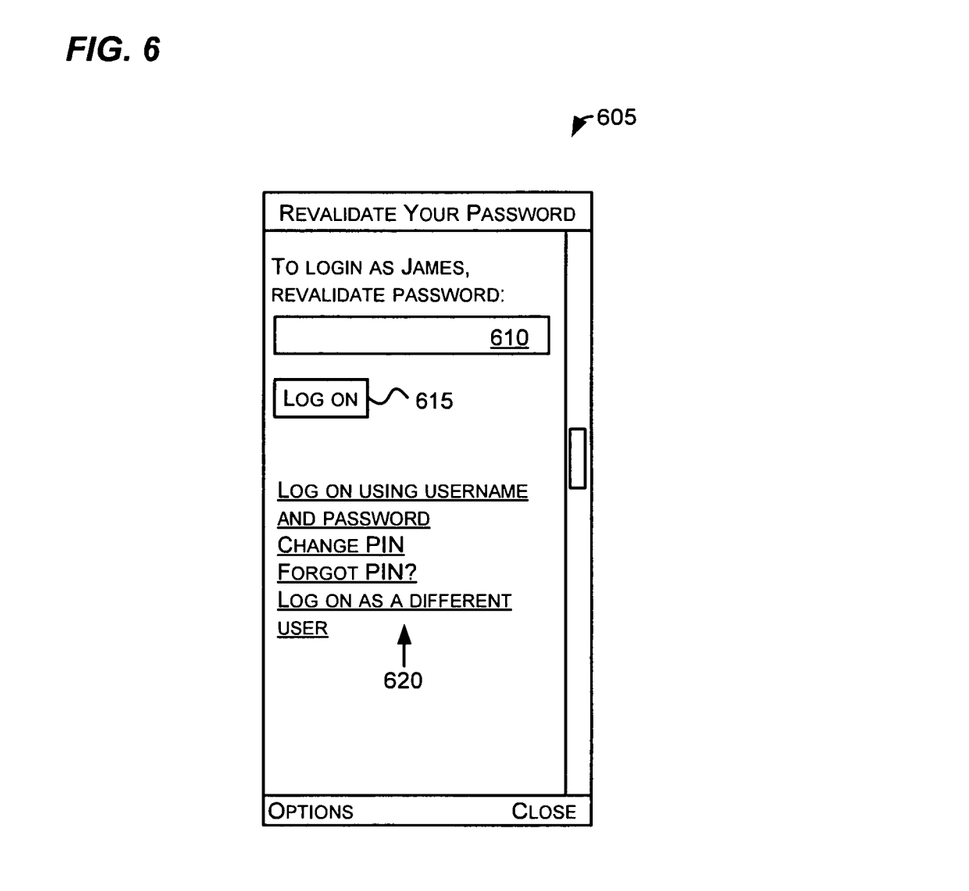
FIG. 6 illustrates some elements of an exemplary user interface that may be used to revalidate a password in accordance with aspects of the subject matter described herein.

At block 415, in response to determining that it is time to revalidate the password, the mobile device may display a screen such as the one illustrated in FIG. 6, which illustrates some elements of an exemplary user interface that may be used to revalidate a password in accordance with aspects of the subject matter described herein.

As illustrated, the screen 605 indicates the name of the user (e.g., James) and provides a text box 610 in which the user may enter the password. The screen 605 also includes a log on button 615 that the user may click on after entering the password to log on to the server.

If the user is successful in logging on to the server, the server may send new encrypted data to the mobile device as described previously. The new encrypted data may then be stored on the mobile device.

If the user wants to log on using a username and password, change the PIN, log on as a different user, or has forgotten the PIN, the user may select an appropriate item from the list 620.

FIGS. 6-11 include exemplary user interfaces that may be used in accordance with various aspects of the subject matter described herein. The user interfaces may include other elements not shown and/or remove and/or replace elements shown with other elements. By providing the interfaces illustrated in these figures, there is no intention to be all-inclusive or exhaustive of the different types of interfaces that may be used to provide the same results as described herein. Indeed, based on the teachings herein, one of skill in the art may recognize many alternative user interfaces that may be utilized to provide the same results without departing from the spirit or scope of aspects of the subject matter described herein.

Returning to FIG. 4, at block 420, the actions continue at block 325 of FIG. 3.

Figure 7:
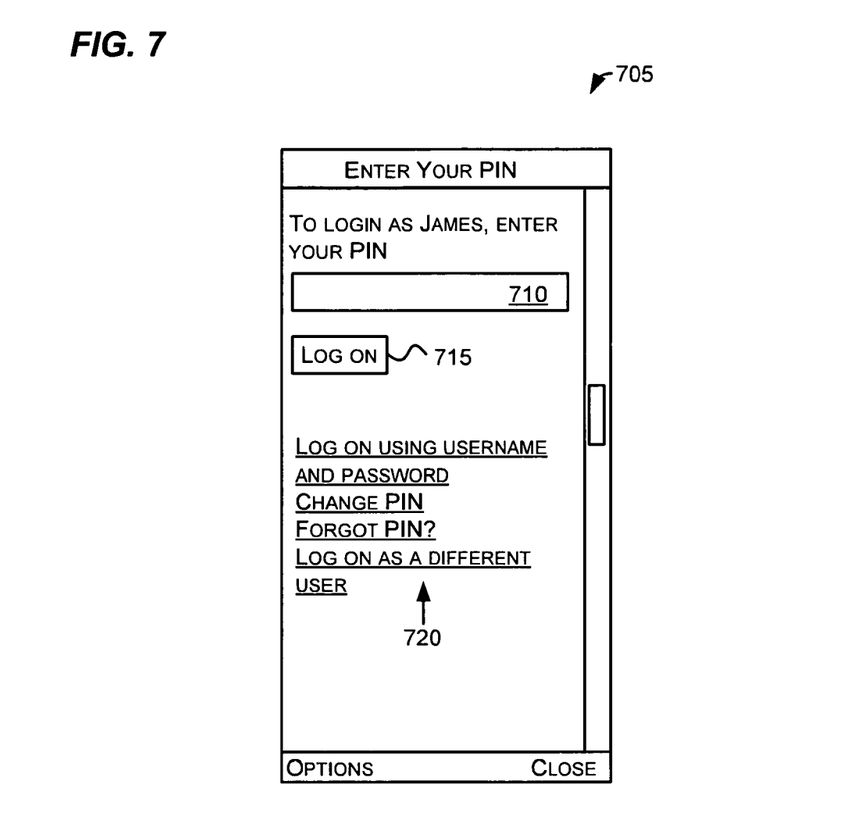
FIG. 7 illustrates some elements of an exemplary user interface that may be used to enter a PIN in accordance with aspects of the subject matter described herein.

At block 425, if it is not time to revalidate the password, the mobile device may display a screen such as the one illustrated in FIG. 7 which illustrates some elements of an exemplary user interface that may be used to enter a PIN in accordance with aspects of the subject matter described herein. As illustrated, the screen 705 provides an indication that the user is to enter a PIN and indicates the name of the user (e.g., James) and provides a text box 710 in which the user may enter the PIN. The screen 705 also includes a log on button 715 that the user may click on after entering the PIN to log on to the server.

If the user wants to log on using a username and password, change the PIN, log on as a different user, or has forgotten the PIN, the user may select an appropriate item from the list 720.

Returning to FIG. 4, at block 430, a mobile device sends the PIN in conjunction with the encrypted data to the server which then authenticates the username and password. For example, referring to FIG. 2, using the received PIN and encrypted data, the server 205 may validate the credentials sent by the mobile device 215. The term "in conjunction" means that the PIN is sent to the server, and can, but does not necessarily mean that the PIN is sent at the same time as the encrypted data or in the same message as the encrypted data.

At block 435, if the credentials are valid, the actions continue at block 445; otherwise, the actions continue at block 440.

At block 440, login errors may be handled as appropriate. For example, if the credentials are not valid, the user may be informed that the login is unsuccessful and may be given an opportunity to re-enter the username and password and/or may be denied access to the server.

At block 445, a determination is made as to whether the PIN is valid. If the PIN is valid, the actions may continue at block 450; otherwise, the actions may continue at block 410. For example, after decrypting the username, password, and valid PIN from the encrypted data, the server may compare the valid PIN with the provided PIN to determine if the provided PIN is valid.

At block 450, the actions continue at block 325 of FIG. 3.

FIG. 5 is a block diagram illustrating actions associated with block 320 of FIG. 3 in accordance with aspects of the subject matter described herein. FIG. 4 includes exemplary actions that may occur during a first or subsequent logon activity used to enter user credentials. At block 505, the actions begin.

Figure 8:
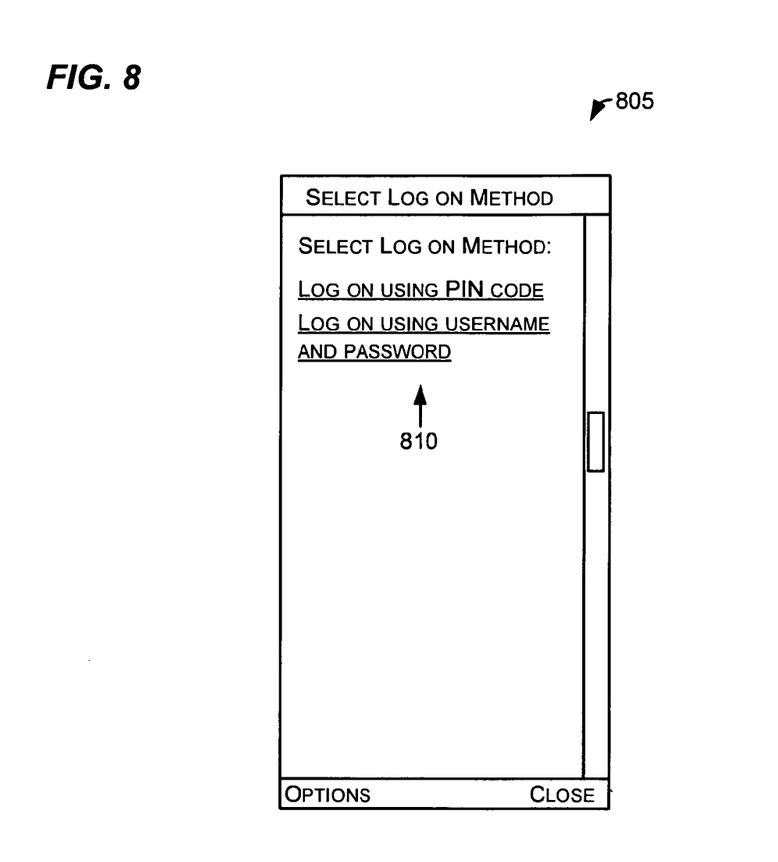
FIG. 8 illustrates some elements of an exemplary user interface that may be used to select a logon preference in accordance with aspects of the subject matter described herein.

If this is the first time the user has used the mobile device to logon to a server, the user may be presented with a screen such as one illustrated in FIG. 8 which illustrates some elements of an exemplary user interface that may be used to select a logon preference in accordance with aspects of the subject matter described herein.

As illustrated in FIG. 8, the screen 805 includes a list 810 that indicates different ways the user may log on to a server. By selecting on an item in the list 810, the user may log on using a PIN or log on using a username and password.

In some embodiments, a server may be configured such that server the may indicate that a user may not use a PIN to log on to the server. In this case, the user may not be presented with the screen illustrated in FIG. 8. Rather, the user may be presented with a screen such as that illustrated in FIG. 9.

Figure 9:
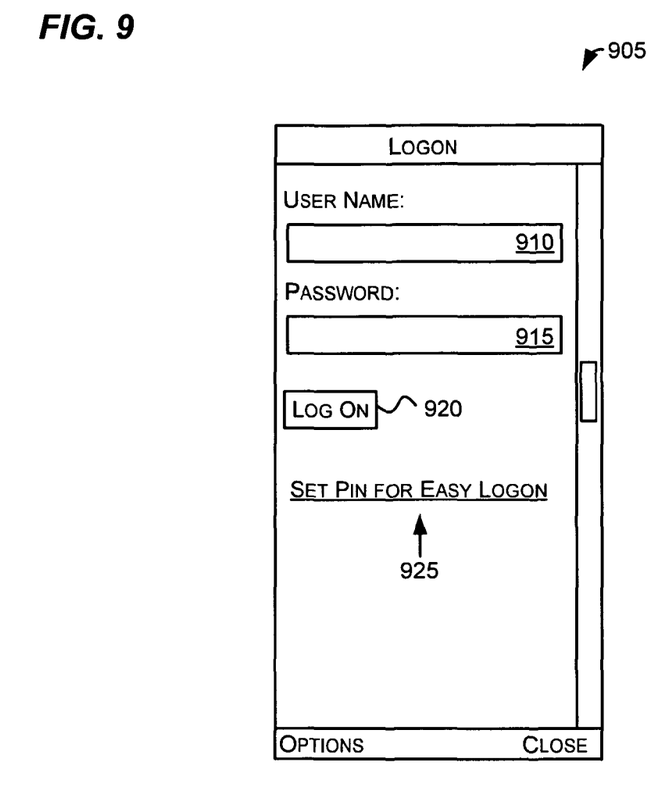
FIG. 9 illustrates some elements of an exemplary user interface that may be used to log on using a username and password in accordance with aspects of the subject matter described herein.

Return to FIG. 5, at block 510, if the user selects to use a username and password without a PIN, the user may be presented with a screen such as that illustrated in FIG. 9, which illustrates some elements of an exemplary user interface that may be used to log on using a username and password in accordance with aspects of the subject matter described herein.

As illustrated in FIG. 9, the screen 905 includes a text box 910 in which the user may enter a username. The screen 905 also includes a text box 915 in which the user may enter a password. After the user has entered a username and password, the user may click on the log on button 920 to log on to a server.

The screen 905 may also include a link 925 that allows the user to enter a PIN for subsequent logons to the server. The link 925 may not be displayed if login via a PIN has been disabled by the server.

Figure 10:
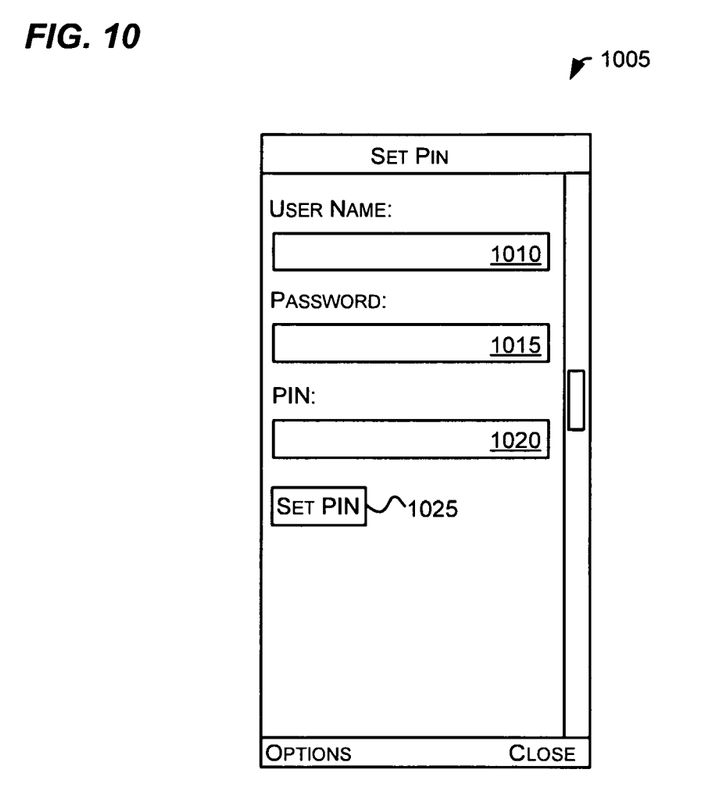
FIG. 10 illustrates some elements of an exemplary user interface that may be used to log on using a PIN in accordance with aspects of the subject matter described herein.

Returning to FIG. 5, at block 510, if the user selects to use a PIN for logon, the user may be presented with a screen such as that illustrated in FIG. 10, which illustrates some elements of an exemplary user interface that may be used to log on using a PIN in accordance with aspects of the subject matter described herein.

As illustrated in FIG. 10, the screen 1005 includes several fields including a text box 1010 in which the user may enter a username, a text box 1015 in which the user may enter a password, and a text box 1020 in which the user may enter a PIN. After the user has entered a username and password, the user may click on the set PIN button 1025 to log on to a server.

Returning to FIG. 5, at block 515, the username and password are authenticated. For example, referring to FIG. 2, the mobile device sends a username and password to the server which then authenticates the username and password. If the user has selected to use a PIN, the selected PIN may also be sent to the server. In response to receiving the username and password, the server authenticates these credentials. For example, referring to FIG. 2, the server 205 may validate the credentials sent by the mobile device 215.

At block 520, if the credentials are valid, the actions continue at block 530; otherwise, the actions continue at block 525.

At block 525, login errors may be handled as appropriate. For example, if the credentials are not valid, the user may be informed that the login is unsuccessful and may be given an opportunity to re-enter the username and password and/or may be denied access to the server.

At block 530, if a PIN is allowed, the actions continue at block 540; otherwise, the actions continue at block 535. As described previously, a server may not allow a user to log in using a PIN/encrypted data combination and may require a username and password with each log on.

At block 535, the actions continue at block 325 of FIG. 3.

At block 540, the offer to use a PIN is provided. For example, referring to FIG. 9, the screen 905 may include a link 925 that allows the user to set a PIN for easy logon. As another example, referring to FIG. 8, this offer may come when the user first attempts to log on.

At block 545, a determination is made as to whether a PIN based logon is selected. If so, the actions continue at block 550; otherwise, the actions continue at block 545. For example, referring to FIGS. 8 and 9, if the user selects a log on using PIN code or a set PIN for easy logon, the user may be presented with a user interface that allows the user to enter a PIN. This PIN together with the username and password may then be sent to the server.

At block 550, in response, the server may generate evidence of authentication and send it to the device. For example, referring to FIG. 2, the server 206 may generate an encrypted data using the received username, password, and PIN. The server 206 may then send this encrypted data to the mobile device that sent the username, password, and PIN (e.g., the mobile device 216).

Figure 11:
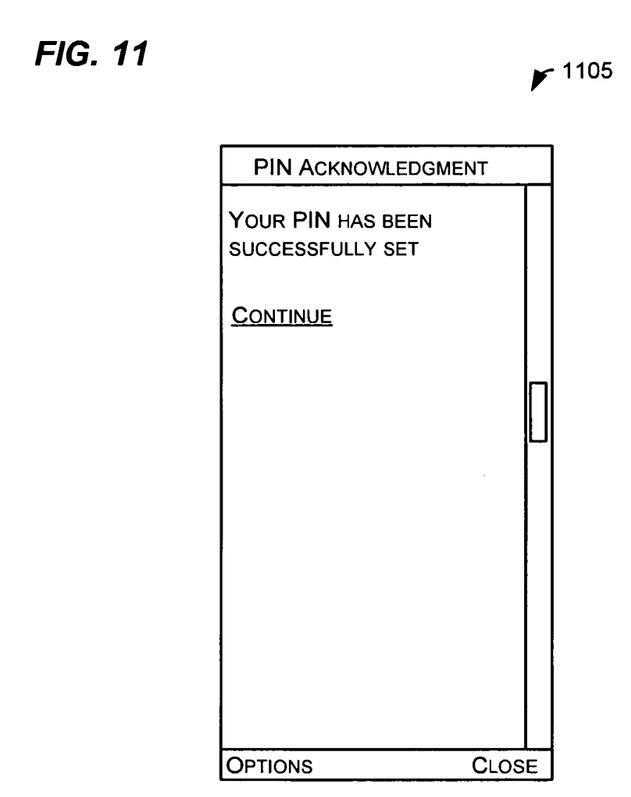
FIG. 11 which illustrates some elements of an exemplary user interface that may be used to provide a PIN acknowledgment in accordance with aspects of the subject matter described herein.

At block 555, the mobile device may display a user interface such as illustrated in FIG. 11, which illustrates some elements of an exemplary user interface that may be used to provide a PIN acknowledgment in accordance with aspects of the subject matter described herein. As illustrated in FIG. 11, the screen 1105 includes an acknowledgment message and an item that allows the user to continue.

At block 560, a server may send data indicating that user refused to use a PIN. This data may be used in subsequent logons when determining what method to use during the logons.

At block 565, the encrypted data is saved on the mobile device. For example, referring to FIG. 2, the mobile device 215 saves the encrypted data locally for subsequent logon use.

At block 570, the actions continue at block 325 of FIG. 3.

In another embodiment, the order of the actions described in conjunction with FIG. 5 may be changed. In particular, before authenticating user credentials, the PIN is validated. If the PIN is valid, then user credentials are validated as described previously. If the PIN is not valid, however, a message may be generated to cause an invalid logon attempt to be recorded in an audit log. This message may comprise generating a message that includes a username and a bogus password and sending the message to an authentication server which then logs the invalid logon attempt.

If a mobile device is stolen, the thief will not have access to the PIN. When a user finds out that the device is stole, the user may change or cause the user credentials (e.g., user password) to be changed. Because the credentials are authenticated with each logon, after the credentials are changed, even if the thief is able to determine the PIN, the thief will not be able to use the mobile device to gain access to resources.

As can be seen from the foregoing detailed description, aspects have been described related to a simplified login for mobile devices. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A mobile device configured for simplified logins, comprising:
   a display to provide a user with a request to enter a first credential and a second credential during a first login;
   a user input interface configured to receive a user input including the first credential and the second credential;
   a transmitter configured to transmit the first credential and the second credential to a validation server;
   a receiver configured to receive encrypted data based on the first credential and the second credential; and
   a processor configured to generate, for a second login, a login screen requesting the second credential and not the first credential, based on whether the first credential is to be revalidated,
      the processor further configured to replace the encrypted data with new encrypted data that is based on a revalidated first credential with a new revalidation date in response to the first credential being revalidated to provide the revalidated first credential.

2. The mobile device of claim 1, wherein the first credential comprises a username and a password.

3. The mobile device of claim 1, wherein the second credential is a PIN.

4. The mobile device of claim 1, wherein the second credential is longer than the first credential.

5. The mobile device of claim 1, further comprising:
   a login component configured to send the second credential, unencrypted, and the encrypted data to the validation server to enable the validation server to compare the second credential, unencrypted, and at least a portion of the encrypted data to determine whether to grant the mobile device access to a resource.

6. The mobile device of claim 5, wherein the login component is configured to embed the encrypted data in a parameter of a uniform resource locator that is associated with the resource.

7. The mobile device of claim 1, wherein the encrypted data indicates whether the first credential is to be revalidated.

8. A method implemented at least in part by a computer to provide simplified logins, the method comprising:
   providing, by a display of the computer, a request for a user to enter a first credential and a second credential during a first login;
   receiving, by a user input interface of the computer, a user input that includes the first credential and the second credential;
   transmitting, by a transmitter of the computer, the first credential and the second credential to a validation server;
   receiving, by a receiver of the computer, encrypted data based on the first credential and the second credential;
   generating, by a processing unit of the computer, a login screen for a second login, the login screen requesting the second credential and not the first credential, based on whether the first credential is to be revalidated; and
   replacing the encrypted data with new encrypted data that is based on a revalidated first credential with a new revalidation date in response to the first credential being revalidated to provide the revalidated first credential.

9. The method of claim 8, wherein the first credential comprises a username and a password.

10. The method of claim 8, wherein the second credential is a PIN.

11. The method of claim 8, wherein the second credential is longer than the first credential.

12. The method of claim 8, further comprising:
    sending the second credential, unencrypted, and the encrypted data to the validation server to enable the validation server to compare the second credential, unencrypted, and at least a portion of the encrypted data to determine whether to grant the computer access to a resource.

13. The method of claim 8, further comprising:
    embedding the encrypted data in a parameter of a uniform resource locator that is associated with a resource.

14. The method of claim 8, wherein the encrypted data indicates whether the first credential is to be revalidated.

15. A computer storage device having computer-executable instructions, which when executed perform actions, comprising:
    provide a request for a user to enter a first credential and a second credential during a first login;
    transmit the first credential and the second credential to a validation server in response to receipt of a user input that includes the first credential and the second credential;
    receive encrypted data based on the first credential and the second credential;
    generate a login screen for a second login, the login screen requesting the second credential and not the first credential, based on whether the first credential is to be revalidated; and
    replace the encrypted data with new encrypted data that is based on a revalidated first credential with a new revalidation date in response to the first credential being revalidated to provide the revalidated first credential.

16. The computer storage device of claim 15, wherein the first credential comprises a username and a password.

17. The computer storage device of claim 15, wherein the second credential is a PIN.

18. The computer storage device of claim 15, wherein the second credential is longer than the first credential.

19. The computer storage device of claim 15, wherein the actions further comprise:
  send the second credential, unencrypted, and the encrypted data to the validation server to enable the validation server to compare the second credential, unencrypted, and at least a portion of the encrypted data to determine whether to grant a computer access to a resource.

20. The computer storage device of claim 15, wherein the actions further comprise:
  embed the encrypted data in a parameter of a uniform resource locator that is associated with a resource.

* * * * *